(12) United States Patent
Taft et al.

(10) Patent No.: US 11,310,151 B2
(45) Date of Patent: Apr. 19, 2022

(54) SYSTEM AND METHOD FOR MANAGING LOOKUPS FOR NETWORK REPOSITORY FUNCTIONS

(71) Applicant: Verizon Patent and Licensing Inc., Arlington, VA (US)

(72) Inventors: David Taft, Keller, TX (US); Sudhakar Reddy Patil, Flower Mound, TX (US); Violeta Cakulev, Millburn, NJ (US); Hossein M. Ahmadi, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 37 days.

(21) Appl. No.: 16/571,404

(22) Filed: Sep. 16, 2019

(65) Prior Publication Data
US 2021/0083965 A1 Mar. 18, 2021

(51) Int. Cl.
| | | |
|---|---|---|
| *H04L 12/733* | (2013.01) | |
| *H04L 1/00* | (2006.01) | |
| *H04W 48/16* | (2009.01) | |
| *H04W 84/04* | (2009.01) | |
| *H04L 45/00* | (2022.01) | |

(52) U.S. Cl.
CPC ............ *H04L 45/20* (2013.01); *H04L 1/0016* (2013.01); *H04W 48/16* (2013.01); *H04W 84/042* (2013.01)

(58) Field of Classification Search
CPC ...................................................... H04L 45/20
See application file for complete search history.

(56) References Cited

U.S. PATENT DOCUMENTS

| | | | | |
|---|---|---|---|---|
| 2002/0176371 A1* | 11/2002 | Behzadi | ................. | H04L 45/02 370/254 |
| 2002/0184357 A1* | 12/2002 | Traversat | ............ | H04L 63/0428 709/223 |
| 2004/0184450 A1* | 9/2004 | Omran | .................. | H04J 3/1617 370/372 |
| 2015/0263833 A1* | 9/2015 | Li | ......................... | H04L 12/403 370/449 |
| 2017/0024450 A1* | 1/2017 | Narayanan | ............ | G06F 16/275 |

FOREIGN PATENT DOCUMENTS

WO WO2020/200268 * 10/2020 ............. H04L 29/08

OTHER PUBLICATIONS

ETSI TS 129510 v15.1.0 (Oct. 2018), 5G; 5G System; Network function repository services; stage 3, 3GPP, 87 pages. (Year: 2018).*

* cited by examiner

*Primary Examiner* — Sithu Ko
*Assistant Examiner* — Won Tae C Kim

(57) ABSTRACT

Systems and methods manage lookups for network repository functions (NRFs). A network device, such as a NRF, receives a discovery request for a network function instance in a wireless core network. The discovery request includes a hop limit value. The network device determines if a result for the discovery request is available and determines if the hop limit value is greater than a stop value, when the result for the discovery request is not available. The network device forwards the discovery request to another network device when the result for the discovery request is not available and when the hop limit value is greater than the stop value. The network device sends a terminal response to the discovery request when the hop limit value is not greater than the stop value.

20 Claims, 7 Drawing Sheets

```
paths:
  /nf-instances:
    get:
      summary: Search a collection of NF Instances
      operationId: SearchNFInstances
      tags:
        - NF Instances (Store)
      parameters:
        - name: target-nf-type
          in: query
          description: Type of the target NF
          required: true
          schema:
            $ref: 'TS29510_Nnrf_NFManagement.yaml#/components/schemas/NFType'
        - name: requester-nf-type
          in: query
          description: Type of the requester NF
          required: true
          schema:
            $ref: 'TS29510_Nnrf_NFManagement.yaml#/components/schemas/NFType'
        - name: nrf-ttl
          in: query
          description: Time to Live
          required: true
          schema:
            $ref: 'TS29510_Nnrf_NFManagement.yaml#/components/schemas/NFttl'
```

710 brackets the nrf-ttl parameter block.

FIG. 7

SYSTEM AND METHOD FOR MANAGING LOOKUPS FOR NETWORK REPOSITORY FUNCTIONS

BACKGROUND INFORMATION

Providers of wireless communication services continue to improve and expand available wireless networks. One aspect of such improvements includes the development of core networks as well as options to utilize such core networks. A core network may manage a large number of devices and/or network functions experiencing different conditions. In a vendor-supplied network function environment, each vendor provides individual network functions that will be grouped into a logical and/or physical set of network functions that will comprise a network slice. The core network will employ point-to-point interfaces and service based architecture (SBA) interfaces for network functions to communicate with other network functions.

BRIEF DESCRIPTION OF THE DRAWINGS

FIG. 7 is an example of an application programming interface (API) format for a network function discovery request, according to an implementation described herein.

DETAILED DESCRIPTION OF PREFERRED EMBODIMENTS

The following detailed description refers to the accompanying drawings. The same reference numbers in different drawings identify the same or similar elements.

Improvements in the core networks of 5G wireless access networks provide new functionality, such as, for example, network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources. A network slice may be configured to implement a different set of requirements and/or priorities or may be associated with a particular Quality of Service (QoS) class, type of service, and/or particular enterprise customer associated with a set of UE devices. In order to implement functionality such as network slicing, a 5th Generation (5G) core network may include various network nodes, known as network functions (NFs).

A Network Repository Function (NRF) is a 3GPP-defined NF that provides NF registration, management, discovery, and authentication services within the 5G core network. When a new NF (an Access and Mobility Function (AMF), for example) is brought online, the new NF will register its reachability and services information with a given NRF so that other NFs are able to discover and communicate with each other. Different types or levels of NRF deployments may be used for networks that employ network slicing.

When establishing a new session for a user device, for example, an NF will query an NRF to discover the destination NF. A given NF can be registered with different NRFs. If the NRF that receives the query does not have the requested information, the NRF may be configured to forward unknown NF discovery requests to another NRF. One consequence of this network structure is that discovery requests have the potential to be repeatedly forwarded throughout the 5GC network. Depending on how an operator deploys NRFs in the network, a discovery request may be forwarded throughout the NRF continuously.

Systems and methods described herein manage NF lookups for NRFs. A configurable time-to-live (ttl) indicator (also referred to a hop limit) may be included within an NF discovery request that is provided to an NRF to prevent recursive or excessive packet forwarding. Each NRF within the NF lookup process may decrement the ttl indicator value until a zero or stop value occurs. According to an implementation, the ttl indicator parameter may be configured to manage the maximum number of NRF hops that a discovery request can be forwarded.

Figure 1:
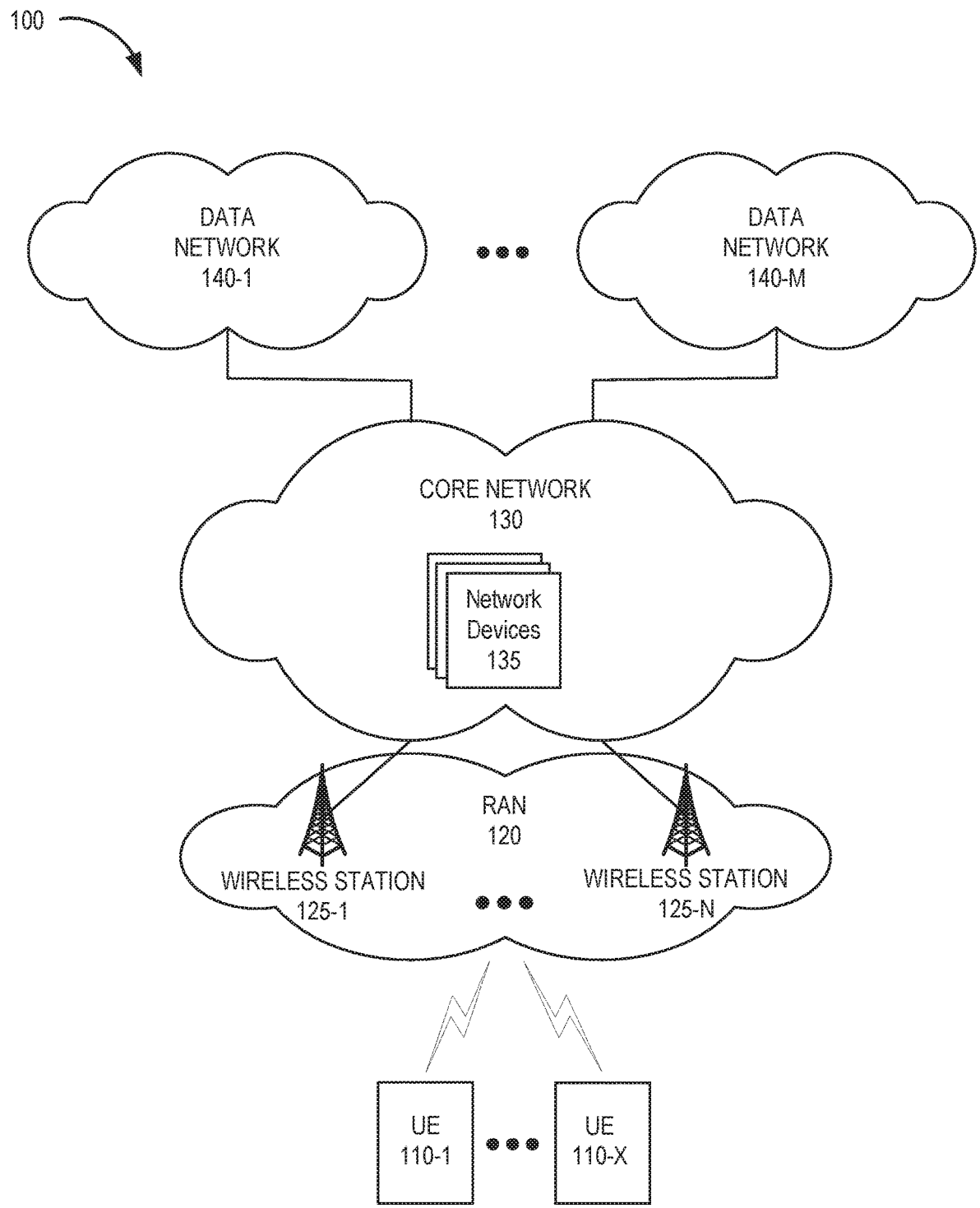
FIG. 1 is a diagram illustrating an environment according to an implementation described herein.

FIG. 1 is a diagram of an exemplary environment 100 in which the systems and/or methods, described herein, may be implemented. As shown in FIG. 1, environment 100 may include user equipment (UE) devices 110-1 to 110-X (referred to herein collectively as "UE devices 110" and individually as "UE device 110"), a radio access network (RAN) 120, a core network 130, and data networks 140-1 to 140-M. RAN 120, core network 130, and data network 140 may be collectively referred to as a transport network.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player, a WiFi access point, a smart television, etc.; a portable gaming system; global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic delivery, and/or other types of capabilities. In some implementations, UE device 110 may communicate using machine-to-machine (M2M) communication, such as machine-type communication (MTC), and/or another type of M2M communication.

RAN 120 may enable UE devices 110 to connect to core network 130 for mobile telephone service, Short Message Service (SMS), Multimedia Message Service (MMS), Internet access, cloud computing, and/or other types of data services. RAN 120 may include wireless stations 125-1 to 125-N (referred to herein collectively as "wireless stations 125" and individually as "wireless station 125"). Each wireless station 125 may service a set of UE devices 110. For example, wireless station 125-1 may service some UE devices 110 when the UE devices 110 are located within the geographic area serviced by wireless station 125-1, while other UE devices 110 may be serviced by another wireless station 125 when the UE devices 110 are located within the geographic area serviced by the other wireless station 125.

Wireless station 125 may include a 5G base station (e.g., a gNB) that includes one or more radio frequency (RF) transceivers facing particular directions. For example, wireless station 125 may include three RF transceivers and each RF transceiver may service a 120-degree sector of a 360-degree field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, wireless station 125 may also include a 4G base station (e.g., an eNodeB). Furthermore, in some implementations, wireless station 125 may include a Multi-Access Edge Computing (MEC) (also referred to as Mobile Edge Computing) system that performs cloud computing and/or provides network processing services for UE devices 110.

Core network 130 may manage communication sessions for UE devices 110. Core network 130 may provide mobility management, session management, authentication, and packet transport, to support UE device 110 and wireless station 125 wireless communications using, for example, a dual connectivity, multi-RAT configuration. Core network 130 may further provide access to data networks 140. Core network 130 may be compatible with known wireless standards which may include, for example, 3GPP 5G, LTE, LTE Advanced, Global System for Mobile Communications (GSM), Universal Mobile Telecommunications System (UMTS), IS-2000, etc. For example, core network 130 may establish an Internet Protocol (IP) connection between UE device 110 and a particular data network 140. Core network 130 may include various types of network devices 135, which may implement different network functions described further herein.

Data networks 140-1 to 140-M (referred to herein collectively as "data networks 140" and generically as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network, an intranet, or a combination of networks. Some or all of a particular data network 140 may be managed by a communication services provider that also manages core network 130, RAN 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
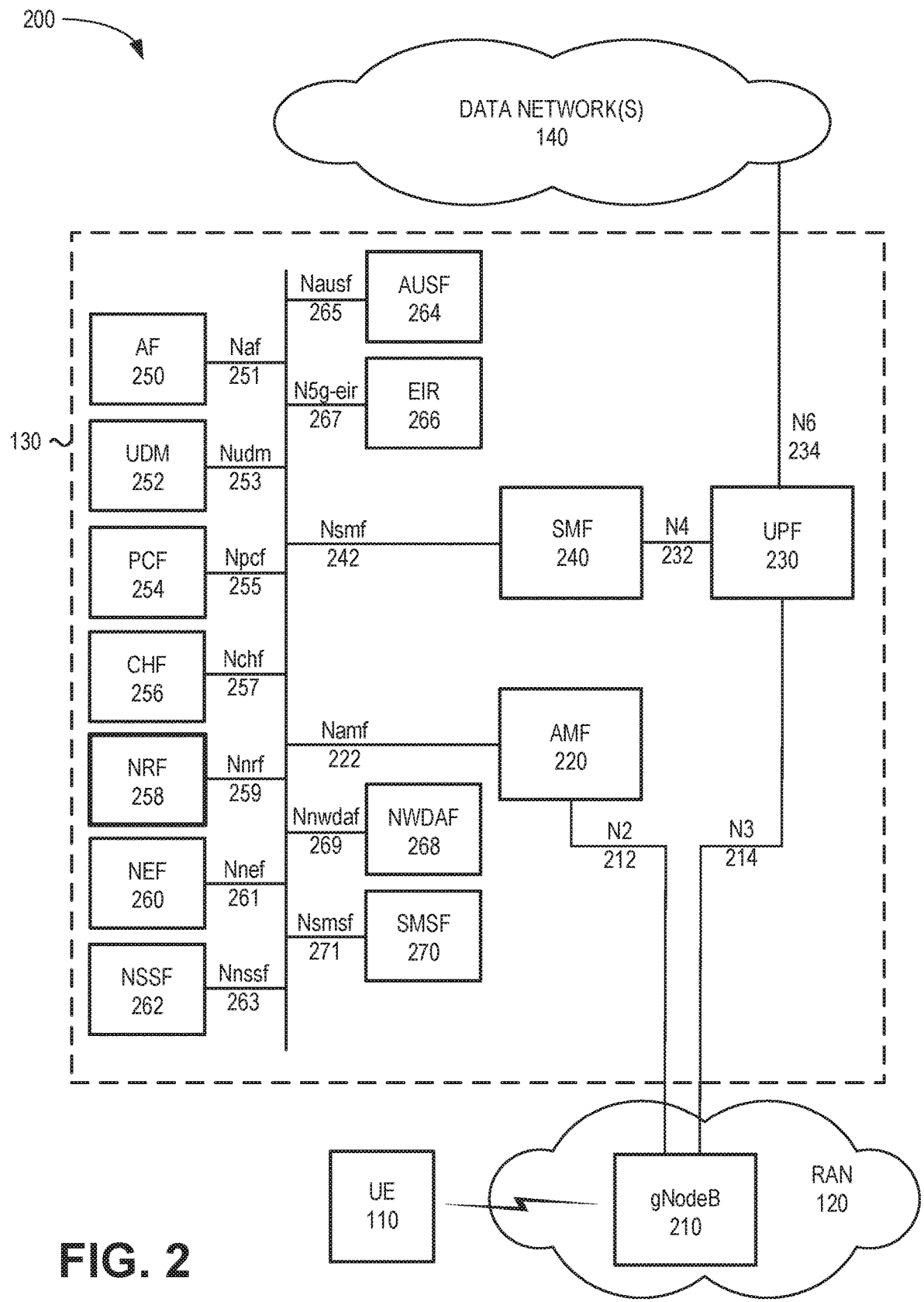
FIG. 2 is a diagram illustrating exemplary components of the core network of FIG. 1 according to an implementation described herein.

FIG. 2 is a diagram illustrating a system 200 that includes exemplary components of core network 130 in the context of environment 100 according to an implementation described herein. As shown in FIG. 2, system 200 may include UE device 110, gNodeB 210, core network 130, and data network 140.

A gNodeB 210 (corresponding to wireless station 125) may include one or more devices (e.g., base stations) and other components. gNode B 210 has functionality that enables UE device 110 to wirelessly connect RAN 120 using 5G NR Radio Access Technology (RAT). For example, gNodeB 210 may service one or more cells, using a wireless transceiver with an antenna array configured for mm-wave wireless communication. gNodeB 210 may correspond to wireless station 125. gNodeB 210 may communicate with AMF 220 using an N2 interface 212 and communicate with UPF 230 using an N3 interface 214.

Core network 130 may include an AMF 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a NWDAF 268, and a Short Message Service Function (SMSF) 270. While FIG. 2 depicts a single instances of these network functions for illustration purposes, in practice, core network 130 may include multiple instances of AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, and SMSFs 270.

The components depicted in FIG. 2 may be implemented as dedicated hardware components (e.g., network devices 135) or as virtualized functions implemented on top of a common shared physical infrastructure using SDN. For example, an SDN controller may implement one or more of the components of FIG. 2 using an adapter implementing a VNF virtual machine, a CNF container, an event driven serverless architecture interface, and/or another type of SDN architecture. The common shared physical infrastructure may be implemented using one or more devices 300 described below with reference to FIG. 3 in a cloud computing center associated with core network 130.

AMF 220 may perform registration management, connection management, reachability management, mobility management, lawful intercepts, Short Message Service (SMS) transport between UE device 110 and an SMSF 270, session management message transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network 140, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a Radio Access Network node (e.g., gNodeB 210), and/or perform other types of user plane processes. UPF 230 may communicate with SMF 240 using an N4 interface 232 and connect to data network 140 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251.

UDM 252 may maintain subscription information for UE devices 110, manage subscriptions, generate authentication credentials, handle user identification, perform access authorization based on subscription data, perform network function (NF) registration management, maintain service and/or session continuity by maintaining assignment of SMF 240 for ongoing sessions, support SMS message delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may support a service discovery function and maintain profiles of available NF devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network key performance indicators (KPIs) associated with the NF device/instance. NRF 258 may be accessible via an Nnrf interface 259.

NEF 260 may expose capabilities and events to other NFs, including third party NFs, AFs, edge computing NFs, and/or other types of NFs. Furthermore, NEF 260 may secure provisioning of information from external applications to core network 130, translate information between core network 130 and devices/networks external to core network 130, support a Packet Flow Description (PFD) function, and/or perform other types of network exposure functions. NEF 260 may be accessible via Nnef interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via N5g-eir interface 267.

NWDAF 268 may collect analytics information associated with RAN 120 and/or core network 130. For example, NWDAF 268 may collect accessibility KPIs (e.g., a Radio Resource Control (RRC) setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), and/or other types of transport network KPIs. Depending on the implementation, NWDAF 268 may generate analytic reports that include unique analytic report identifiers to enable tracking of feedback from consumer NFs. SMSF 270 may perform SMS services for UE devices 110. SMSF 270 may be accessible via Nsmsf interface 271.

According to implementations described herein, each NF in system 200 that submits discovery requests may be configured to include a hop limit. In one implementation, the hop limit may be included within an information element (IE) of a 5G NF discovery request (e.g., an HTTP GET message using the Service Based Architecture of core network 130). In other implementations, the hop limit may be included within a "shim" header or wrapped in another header, for example. The hop limit may be a configurable value, provided, for example, by a network operator. In another implementation, the hop limit may be a software defined value based on, for example, the number of different NRF tiers in core network 130. An interface of NRF 258 (e.g., Nnrf interface 259) may be modified in order to support the communication of the hop limit value. For example, each NRF 258 may be configured to identify, decrement, and update the hop limit value.

Although FIG. 2 shows exemplary components of core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130. For example, core network 130 may include additional function nodes not shown in FIG. 2, such as a Unified Data Repository (UDR), an Unstructured Data Storage Network Function (UDSF), a Location Management Function (LMF), a Lawful Intercept Function (LIF), a binding support function (BSF), and/or other types of functions. Furthermore, while particular interfaces have been described with respect to particular function nodes in FIG. 2, additionally, or alternatively, core network 130 may include a reference point architecture that includes point-to-point interfaces between particular function nodes.

Figure 3:
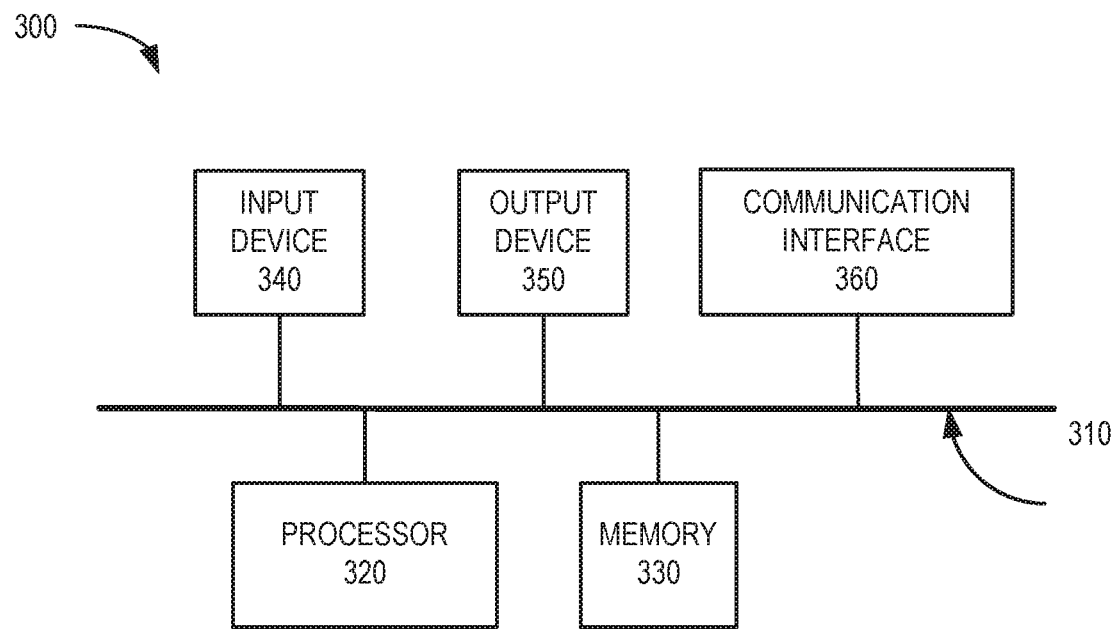
FIG. 3 is a diagram illustrating exemplary components of a device that may be included in a component of FIG. 1 or FIG. 2 according to an implementation described herein.

FIG. 3 is a diagram illustrating example components of a device 300 according to an implementation described herein. UE device 110, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, and/or other components of core network 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to implementing closed loop analytics feedback for a transport network. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
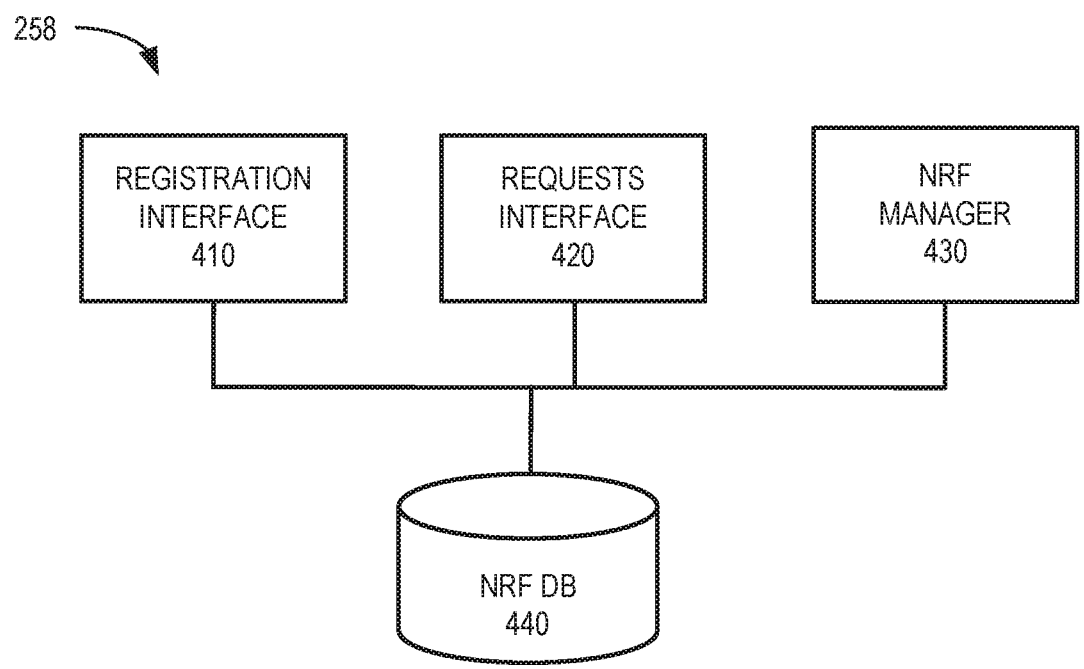
FIG. 4 is a diagram illustrating exemplary components of the Network Repository Function (NRF) of FIG. 2.

FIG. 4 is a diagram illustrating exemplary logical components of NRF 258. The components of NRF 258 may be implemented, for example, via processor 320 executing instructions from memory 330. Alternatively, some or all of the components of NRF 258 may be implemented via hard-wired circuitry. As shown in FIG. 4, NRF 258 may include a registration interface 410, a requests interface 420, a NRF manager 430, and a NRF database (DB) 440.

Registration interface 410 may be configured to receive a registration message from a NF (e.g., executed on a network device 135) in core network 130. For example, when a new NF (e.g., an AMF 220, a UPF 230, an SMF 240, etc.) is brought online and/or activated in core network 130, the new NF may register with NRF 258 via registration interface 410. The registration message may include an NF profile. An NF profile may include, for example, a NF instance ID associated with a NF instance, information identifying the type of NF associated with the NF instance, a PLMN ID associated with the NF instance, network slices associated with the NF instance, endpoint information for each supported service associated with the NF instance, and/or other types of NF information.

Requests interface 420 may be configured to respond to discovery requests (e.g., 5G NF discovery requests) for particular types of NFs. For example, if an SMF 240 needs to find a UPF device, SMF 240 may send a discovery request to NRF 258 via requests interface 420 for an available UPF 230. Requests interface 420 may, for example, refer to NRF DB 440 and respond to the discovery request with information identifying one or more available UPFs 230. If an NRF 258 cannot identify a NF that is the subject of a discovery request, requests interface 420 may forward the discovery request to another NRF. When a discovery request is to be forwarded, requests interface 420 may identify in an information element the value of the ttl indicator (or hop limit) for the discovery request, decrement the value of the ttl indicator, and replace the ttl indicator with the decremented value in the forwarded the discovery request. If the ttl indicator value has reached zero, requests interface 420 will not forward the discovery request and may instead respond to the requesting NF with an error message or other indication that a hop limit has been reached.

NRF manager 430 may manage NRF functionality associated with NRF 258, such as registering NF devices, responding to NF requests, and/or receiving and storing KPI information relating to NF devices in core wireless network 130 in NRF DB 440. Additionally, NRF manager 430 may include a forwarding hierarchy (e.g., another NRF) to forward a discovery request that cannot be answered by the current NRF.

NRF DB 440 may store NF profiles of registered NFs. As discussed, each NF profile may include, for a particular NF instance, an NF instance ID, a NF type, a PLMN ID associated with the NF, network slice IDs associated with the NF, capacity information for the NF, service authorization information for the NF, supported services associated with the NF, endpoint information for each supported service associated with the NF, and/or other types of NF information.

Although FIG. 4 shows exemplary components of NRF 258, in other implementations, NRF 258 may include fewer components, different components, differently arranged components, or additional components than depicted in FIG. 4. Additionally, or alternatively, one or more components of NRF 258 may perform functions described as being performed by one or more other components of NRF 258.

Figure 5:
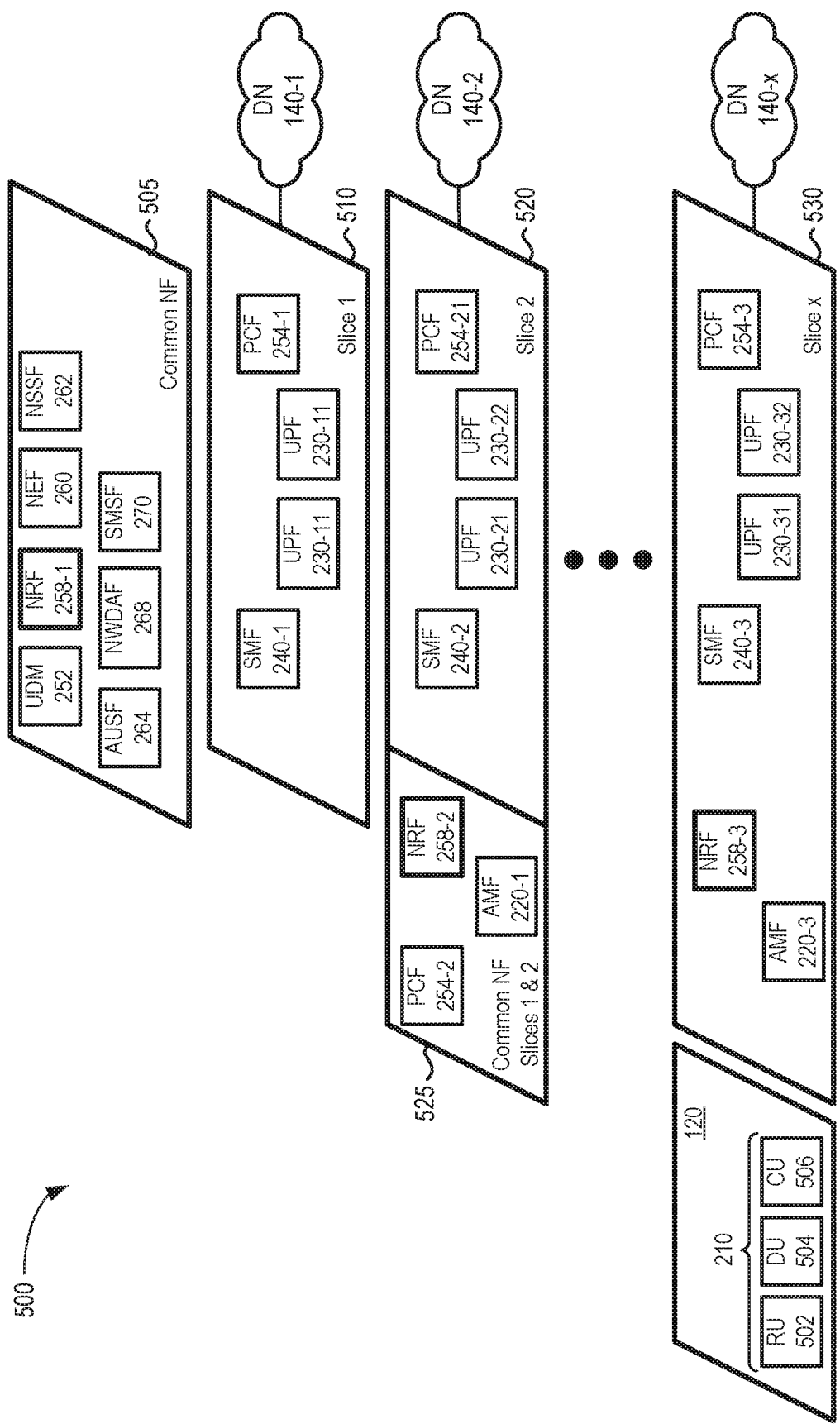
FIG. 5 is an illustration of a network slicing configuration for a network environment in which the systems and methods described herein may be implemented.

FIG. 5 is a simplified illustration of a network slicing configuration for a network environment 500 in which the systems and methods described herein may be implemented. In the example of FIG. 5, network environment 500 includes a common set of NFs 505 for a PLMN and three network slices 510, 520, and 530. A UE device (not shown) may access each of network slices 510, 520, and 530 via a gNodeB 210 of RAN 120. The gNodeB 210 may include multiple distributed components, such as a central unit (CU) 502, a distributed unit (DU) 504, a remote unit (RU) 506. Each of network slices 510, 520, and 530 may include one or more NFs or virtual NFs that provide the networking capabilities available to users (e.g., UE device 110) of the network slice. Within the network slice, a UE device 110 may have one or multiple QoS flows.

In the example of FIG. 5, the set of common NFs 505 may include, among other network functions, UDM 252, NRF 258-1, NEF 260, NSSF 262, AUSF 264, NWDAF 268, and SMSF 270. Network slice 510 may include, among other network functions, SMF 240-1, UPF 230-11, UPF 230-12, and PCF 254-1, associated with communications for data network 140-1. Network slice 520 may include, among other network functions, SMF 240-2, UPF 230-21, UPF 230-22, and PCF 254-21, associated with communications for data network 140-2. Network slices 510 and 520 may include a set of common NFs 525 to support network slices 510 and 520. The set of common NFs 525 may include, among other network functions, AMF 220-1, PCF 254-2, and NRF 258-2. Network slice 530 may include, among other network functions, SMF 240-3, UPF 230-31, UPF 230-32, and PCF 254-3, associated with communications for data network 140-3.

In the arrangement of FIG. 5, assume NRFs 258-1, 258-2, and 258-3 are configured with information for NFs in different slice arrangements. NRF 258-1 may be configured with information for the entire PLMN. NRF 258-2 may be configured with information for slices 510 and 520. NRF 258-3 may be configured with information belonging to a single-NSSAI (S-NSSAI) for slice 530. Thus, a device seeking to communicate with a NF for one of network slices 510, 520 (including the set of NFs 525), or 530 may initiate a lookup through multiple NRF (including, e.g., NRFs 258-1, 258-2, and 258-3) to obtain information for a particular NF. Depending on the configuration of network environment 500, if none of NRFs 258-1, 258-2, and 258-3 is able to respond to a particular discovery request, the discovery request may continue to be routed among the NRFs or may be forwarded to other NRFs (not shown).

According to implementations described herein, a time to live (ttl) indicator value may be applied to prevent a recursive discovery request. The ttl indicator may use a configurable value that is consistent with the maximum amount of NRFs available for a given network configuration. For example, if environment 500 supports a maximum number of three NRF tiers (e.g., a PLMN tier, a shared-slice tier, and a specific slice tier), a ttl indicator value may be set to 3 or 4 to prevent unnecessary packet forwarding. As another example, a network configuration that supports five network tiers may use an indicator value of between 5 and 10. By contrast, a typical packet in an IP network may otherwise have a default limit of 255 hops.

Figure 6:
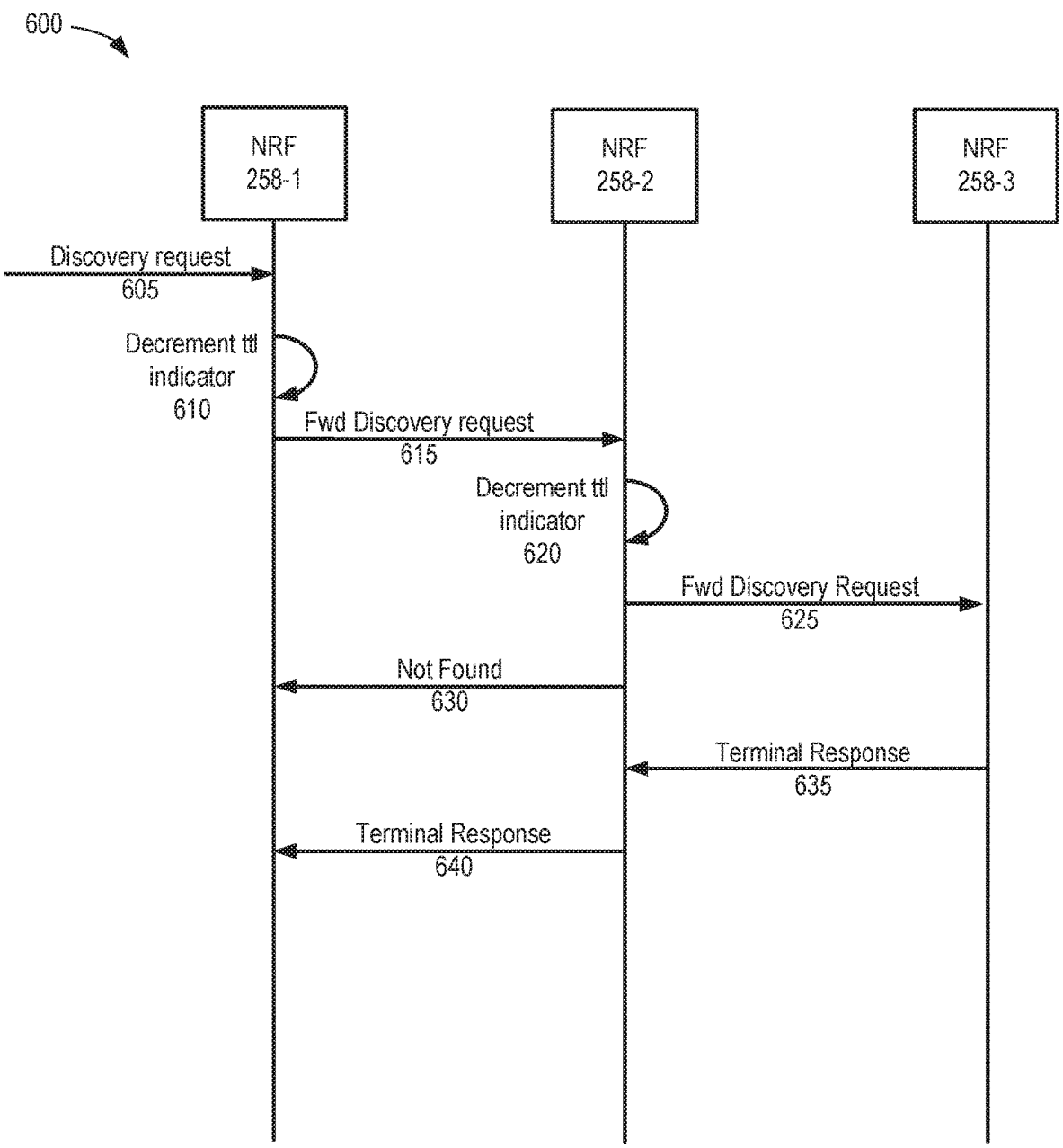
FIG. 6 is a signal flow diagram illustrating exemplary communications for managing lookups for network repository functions.

FIG. 6 is a signal flow diagram illustrating exemplary communications in a portion 600 of network environment 400 to perform a NF lookup through multiple NRFs. As shown in FIG. 6, network portion 600 may include NRF 258-1, NRF 258-2, and NRF 258-3. Each NRF 258 may correspond to one or more network devices 135. FIG. 6 provides simplified illustrations of communications in network portion 600 and are not intended to reflect every signal or communication exchanged between devices/functions.

As shown in FIG. 6, NRF 258-1 may receive a discovery request 605 for a NF for which NRF 258-1 does not contain information. For example, an NF, such as AMF 220, may submit discovery request 605 (e.g., in the form of an HTTP GET request using a structured application programming interface (API)) to NRF 258-1, querying for a list of SMFs 240 which are registered with a specific set of supported services. As described above, the HTTP GET request may also include a request ttl indicator (e.g., inserted as an information element, a shim header, etc.). FIG. 7 includes an example, API 700 for an NF discovery request that incorporates a ttl information element. Particularly, a new parameter section 710 may be added to the 3GPP 29.510 Specification to include a configurable "nrf-ttl" parameter that defines a hop limit for the NF discovery request.

NRF 258-1 may authenticate and validate the incoming discovery request 605. Once the discovery request has passed all the checks, NRF 258-1 may search local resources (e.g., registered and stored profiles of NFs received via registration interface 410), for matches against the query list received in discovery request 605. Assuming NRF 258-1 does not find a match for discovery request 605, NRF 258-1 will forward the request to a different NRF. Assume that NRF 258-1 is configured to forward unknown NF discovery requests to NRF 258-2. NRF 258-1 may decrement the ttl indicator value 610 for the request. Assume the ttl value does not fall to zero.

NRF 258-1 may forward discovery request 615 (e.g., "GET . . . /nf-instances?<query parameters with nrf-ttb") to NRF 258-2 with the decremented ttl value. Assume NRF 258-2 also does not contain the requested NF information. In response to discovery request 615, NRF 258-2 may decrement the ttl indicator value 620 for the request. Assume the ttl value does not falls to zero (or another stop value), and that NRF 258-2 is configured to forward unknown NF discovery requests to NRF 258-3. NRF 258-2 may forward discovery request 625 (e.g., "GET . . . /nf-instances?<query parameters with nrf-ttb") to NRF 258-3 with the ttl value of zero. According to an implementation, NRF 258-2 may optionally provide a not found message 630 (e.g., a SIP 404 Not Found message) to NRF 258-1 to indicate that NRF 258-2 does not contain the requested NF information.

In response to discovery request 625, NRF 258-3 may indicate that no further forwarding is available (e.g., ttl=0). Thus, NRF 258-3 may provide a terminal response 635 for the discovery request to NRF 258-2. The terminal response 635 may include either the answer/information requested in the discovery request or an error/failure indication. Thus, if NRF 258-3 contains the requested NF information, terminal response 635 may include the requested result. Alternatively, if NRF 258-3 does not contains the requested NF information, terminal response 635 may include a failure message. NRF 258-2 may receive terminal response 635 and may forward the response to NRF 258-1 as terminal response 640.

Although FIG. 6 shows exemplary communications between different NRFs 258, in other implementations, more or fewer NRFs 258 may be included than depicted in FIG. 6. For example, according to an implementation, an unanswered discovery request may be forwarded up through any configurable hop limit.

Figure 8:
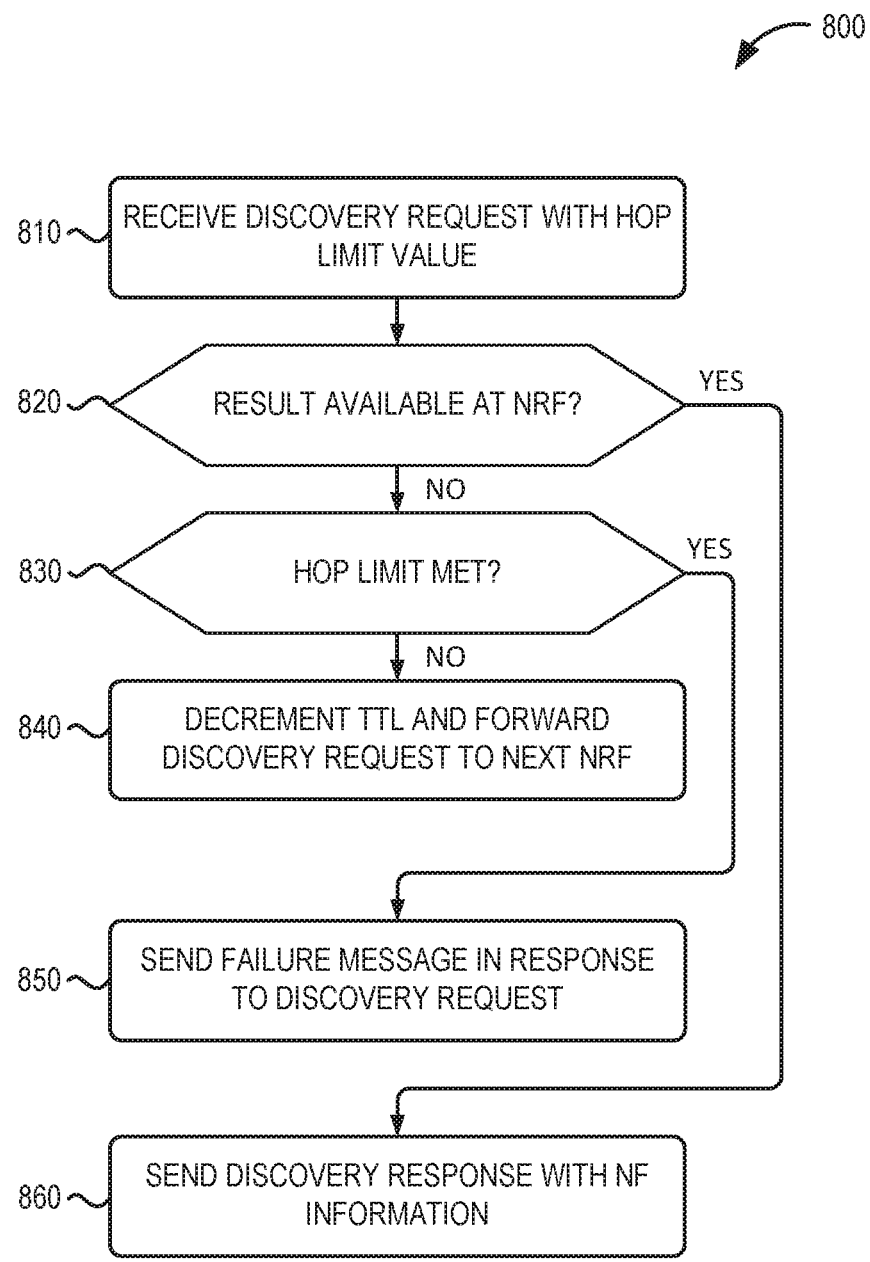
FIG. 8 is a flow diagram illustrating an exemplary process for managing lookups for network repository functions in a core network, according to an implementation described herein.

FIG. 8 is a flow diagram illustrating an exemplary process 800 for managing lookups for network repository functions, according to an implementation described herein. In one implementation, process 800 may be implemented by one or more NRFs 258. In another implementation, process 800 may be implemented by NRF 258 in conjunction with one or more other network devices in network environment 100.

Process 800 may include receiving a discovery request with a hop limit value (block 810) and determining if a result for the discovery request is available at the NRF (block 820). For example, as shown above in FIG. 6, NRF 258-1 may receive discovery request 605 and may determine (e.g., via request interface 420) if the NRF has locally-stored information to answer the discovery request.

If the result for the discovery request is not available (block 820—No), process 800 may include determining if the hop limit has been met (block 830). For example, as shown above in FIG. 6, NRF 258-1 may not have locally-stored information to answer the discovery request and may inspect the ttl value in the information element of the discovery request.

If the hop limit has not been met (block 830—No), process 800 may include decrementing the hop limit value and forwarding the discovery request to the next NRF (block 840). For example, if the ttl value in the information element of the discovery request is not zero, NRF 258-1 may decrement the ttl value by one and forward the discovery request (with the decremented ttl value) to, for example, NRF 258-2. NRF 258-2 may then repeat process 800.

If the hop limit has been met (block 830—Yes), process 800 may include sending a failure message in response to the discovery request (block 850). For example, if NRF 258-1 identifies that the ttl value is at zero, NRF 258-1 may respond with a failure/error message to the NF that sent the discover request.

If the result for the discovery request is available (block 730—Yes), process 700 may include sending a discovery response with the NF information (block 760). For example, if NRF 258-1 has locally stored NF information to support the discovery request, NRF 258-1 may respond to the discovery request with the requested information.

Systems and methods described herein manage NF lookups for NRFs in a 5G wireless core network. A network device, such as a NRF, receives a discovery request for a network function instance in the wireless core network. The discovery request includes a hop limit value. The network device determines if a result for the discovery request is available and determines if the hop limit value is greater than a stop value, when the result for the discovery request is not available. The network device forwards the discovery request to another network device when the result for the discovery request is not available and when the hop limit value is greater than the stop value. The network device sends a terminal response to the discovery request when the hop limit value is not greater than the stop value.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a first Network Repository Function (NRF) device in a wireless core network, a discovery request submitted by a network function instance that is not an NRF, wherein the discovery request includes an HTTP GET message including an information element with a software-defined hop limit value, and wherein the hop limit value is determined based on a number of different NRF tiers in the wireless core network;
   determining, by the first NRF device, if information requested by the discovery request is available at the first NRF device;
   determining, by the first NRF device, if the hop limit value is greater than a stop value, when the information for the discovery request is not available;
   decrementing, by the first NRF device, the hop limit value in the discovery request when the information for the discovery request is not available and when the hop-limit value is greater than the stop value;
   forwarding, by the first NRF device, the discovery request with the decremented hop limit value to a second NRF device; and
   sending, by the first NRF device, a terminal response with the information to the network function instance when the hop-limit value is not greater than the stop value.

2. The method of claim 1, wherein sending the terminal response comprises:
   sending an error message that is responsive to the discovery request when the information for the discovery request is not available to the first NRF device.

3. The method of claim 1, wherein sending the terminal response comprises:
   sending a discovery answer that is responsive to the discovery request when the information for the discovery request is available to the first NRF device.

4. The method of claim 1, wherein the first NRF device includes an NRF instance for a Public Land Mobile Network (PLMN), and wherein the second NRF device includes an NRF instance for a network slice.

5. The method of claim 1, wherein the different NRF tiers in the wireless core network include a PLMN tier, a shared-slice tier, and a specific slice tier.

6. The method of claim 1, wherein receiving the discovery request includes:
   receiving the discovery request from one of an Access and Mobility Function (AMF), a Session Management Function (SMF), or a Policy Control Function (PCF) in the wireless core network.

7. The method of claim 1, wherein receiving the discovery request includes:
   receiving the discovery request via a Nnrf interface that is modified to support communication of the hop limit value.

8. The method of claim 1, wherein decrementing the hop limit value comprises changing the hop limit value in the information element of the discovery request.

9. The method of claim 1, wherein the discovery request is initiated by a third network device, the method further comprising:
   storing, by the third network device, the hop limit value for the discovery request.

10. The method of claim 9, further comprising:
    inserting, by the third network device, the hop limit value in the discovery request.

11. A first Network Repository Function (NRF) device, comprising:
    a memory storing instructions; and
    a processor configured to execute the instructions to:
    receive a discovery request submitted by a network function instance that is not an NRF, wherein the discovery request includes an HTTP GET message including an information element with a software-defined hop limit value, and wherein the hop limit value is determined based on a number of different NRF tiers in the wireless core network;

determine if information requested by the discovery request is available at the first NRF device;

determine if the hop limit value is greater than a stop value, when the information for the discovery request is not available;

decrement the hop limit value in the discovery request when the information for the discovery request is not available and when the hop-limit value is greater than the stop value;

forward the discovery request with the decremented hop limit value to a second NRF device; and send a terminal response with the information to the network function instance when the hop-limit value is not greater than the stop value.

12. The first NRF device of claim 11, wherein, when sending the terminal response, the processor is further configured to execute the instructions to:

send an error message that is responsive to the discovery request when the information for the discovery request is not available to the first NRF device.

13. The first NRF device of claim 11, wherein, when sending the terminal response, the processor is further configured to execute the instructions to:

send a discovery answer that is responsive to the discovery request when the information for the discovery request is available to the first NRF device.

14. The first network device of claim 11, wherein the first NRF device includes an NRF instance for a single network slice within a Public Land Mobile Network (PLMN), and wherein the second NRF device includes an NRF instance for multiple slices within the PLMN network.

15. The first NRF device of claim 11, wherein the different NRF tiers in the wireless core network include a PLMN tier, a shared-slice tier, and a specific slice tier.

16. The first NRF device of claim 11, wherein, when receiving the discovery request, the processor is further configured to execute the instructions to:

receive the discovery request via a Nnrf interface that is modified to support communication of the hop limit value.

17. The first NRF device of claim 11, wherein, when decrementing the hop limit value, the processor is further configured to execute the instructions to:

change the hop limit value in the information element of the discovery request.

18. A non-transitory computer-readable medium containing instructions executable by at least one processor, the computer-readable medium comprising one or more instructions to:

receive a discovery request submitted by a network function instance that is not a Network Repository Function (NRF), wherein the discovery request includes an HTTP GET message including an information element with a software-defined hop limit value, and wherein the hop limit value is determined based on a number of different NRF tiers in the wireless core network;

determine if a result for the discovery request is available at a first NRF device;

determine if the hop limit value is greater than a stop value, when the information for the discovery request is not available;

decrement the hop limit value in the discovery request when the information for the discovery request is not available and when the hop-limit value is greater than the stop value;

forward the discovery request with the decremented hop limit value to a second NRF device; and send a terminal response with the information to the network function instance when the hop limit value is not greater than the stop value.

19. The non-transitory computer-readable medium of claim 18, wherein the different NRF tiers in the wireless core network include a PLMN tier, a shared-slice tier, and a specific slice tier.

20. The non-transitory computer-readable medium of claim 18, wherein the one or more instructions to send a terminal response to the discovery request comprise instructions to:

send an error message that is responsive to the discovery request when the information for the discovery request is not available, and send a discovery answer that is responsive to the discovery request when the information for the discovery request is available.

* * * * *